(12) United States Patent
Dinu et al.

(10) Patent No.: US 10,941,709 B2
(45) Date of Patent: Mar. 9, 2021

(54) GAS TURBINE ENGINE AND COOLING AIR CONFIGURATION FOR TURBINE SECTION THEREOF

(71) Applicant: PRATT & WHITNEY CANADA CORP., Longueuil (CA)

(72) Inventors: Ion Dinu, Candiac (CA); Mohammed Ennacer, St-Hubert (CA); René Paquet, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 229 days.

(21) Appl. No.: 16/145,366

(22) Filed: Sep. 28, 2018

(65) Prior Publication Data

US 2020/0102887 A1     Apr. 2, 2020

(51) Int. Cl.
| | |
|---|---|
| F01D 25/12 | (2006.01) |
| F02C 7/18 | (2006.01) |
| F01D 25/14 | (2006.01) |
| F01D 11/24 | (2006.01) |

(52) U.S. Cl.
CPC ............. *F02C 7/18* (2013.01); *F01D 11/24* (2013.01); *F01D 25/12* (2013.01); *F01D 25/14* (2013.01)

(58) Field of Classification Search
CPC .......... F01D 25/12; F01D 25/14; F01D 25/26; F01D 11/24; F02C 7/18; F02C 7/12
See application file for complete search history.

(56) References Cited

U.S. PATENT DOCUMENTS

| | | | | |
|---|---|---|---|---|
| 3,427,000 A | * | 2/1969 | Scalzo | F01D 9/042 415/108 |
| 3,751,909 A | | 8/1973 | Kohler | |
| 3,966,354 A | * | 6/1976 | Patterson | F01D 11/18 415/116 |
| 5,297,386 A | * | 3/1994 | Kervistin | F04D 27/023 60/226.1 |
| 6,179,557 B1 | * | 1/2001 | Dodd | F01D 9/00 415/108 |
| 6,227,800 B1 | * | 5/2001 | Spring | F01D 11/24 415/116 |
| 6,625,989 B2 | * | 9/2003 | Boeck | B64D 33/08 415/178 |
| 8,181,443 B2 | | 5/2012 | Rago | |
| 9,157,331 B2 | * | 10/2015 | Laurello | F01D 11/24 |
| 9,279,341 B2 | | 3/2016 | Durocher et al. | |
| 9,759,092 B2 | | 9/2017 | Moreton et al. | |
| 10,612,466 B2 | * | 4/2020 | Eastwood | B64D 33/02 |
| 2002/0182057 A1 | * | 12/2002 | Liotta | F01D 9/041 415/115 |

(Continued)

*Primary Examiner* — William H Rodriguez
(74) *Attorney, Agent, or Firm* — Norton Rose Fulbright Canada LLP

(57) ABSTRACT

The gas turbine engine can have a gas path extending in serial flow communication across a compressor, a combustion chamber, and a turbine, the turbine having at least one multistage turbine section having a front toward the combustion chamber and a rear opposite the front, a plenum radially outward of the gas path, and a plurality of aperture sets interspaced from one another between the front and the rear, the aperture sets providing fluid flow communication from the plenum to the gas path, and a cooling air path having an outlet fluidly connected to the plenum at the rear of the plenum.

18 Claims, 2 Drawing Sheets

(56) References Cited

U.S. PATENT DOCUMENTS

| | | | |
|---|---|---|---|
| 2003/0035722 A1* | 2/2003 | Barrett | F01D 9/04 415/200 |
| 2004/0047725 A1* | 3/2004 | Tomita | F01D 11/005 415/116 |
| 2004/0101400 A1* | 5/2004 | Maguire | F01D 11/08 415/116 |
| 2005/0058534 A1* | 3/2005 | Lee | F01D 25/12 415/116 |
| 2005/0111965 A1* | 5/2005 | Lowe | F01D 25/12 415/116 |
| 2006/0225430 A1* | 10/2006 | Paprotna | F02C 7/12 60/782 |
| 2007/0059178 A1* | 3/2007 | Shapiro | F01D 11/08 416/181 |
| 2008/0131260 A1* | 6/2008 | Lee | F01D 9/04 415/115 |
| 2010/0005869 A1* | 1/2010 | Traverso | F01D 5/085 73/112.01 |
| 2010/0047056 A1* | 2/2010 | Lee | F01D 9/041 415/115 |
| 2010/0139288 A1* | 6/2010 | Rago | F02C 7/185 60/785 |
| 2010/0281879 A1* | 11/2010 | Shapiro | F01D 5/08 60/782 |
| 2012/0134781 A1* | 5/2012 | Khanin | F01D 25/12 415/115 |
| 2012/0134788 A1* | 5/2012 | Taillant | F01D 11/005 415/178 |
| 2014/0020359 A1* | 1/2014 | Mimura | F01D 11/08 60/39.182 |
| 2014/0030073 A1* | 1/2014 | Lacy | F01D 25/12 415/177 |
| 2014/0341731 A1* | 11/2014 | Scott | F01D 11/003 415/214.1 |
| 2017/0175751 A1* | 6/2017 | Moniz | F01D 11/24 |
| 2018/0156056 A1 | 6/2018 | Bonacum et al. | |
| 2020/0208533 A1* | 7/2020 | Kapadia | F02K 3/06 |

\* cited by examiner

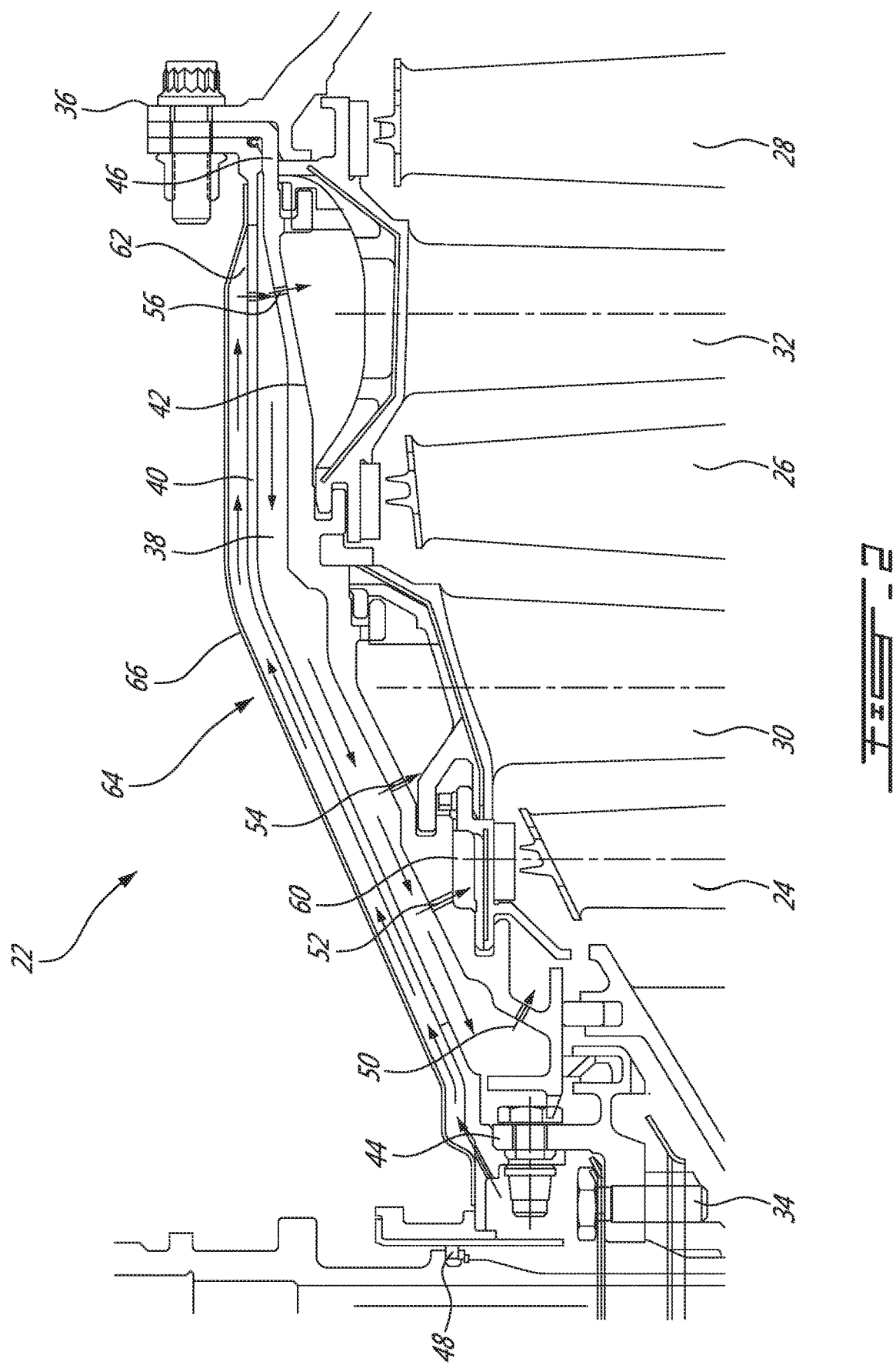

GAS TURBINE ENGINE AND COOLING AIR CONFIGURATION FOR TURBINE SECTION THEREOF

TECHNICAL FIELD

The application related generally to gas turbine engines and, more particularly, to turbine sections.

BACKGROUND OF THE ART

In order to control the temperature of components of turbine sections of gas turbine engines, it was known to circulate cooling air from front to rear in a plenum disposed radially externally to the turbine section. Apertures leading radially internally were provided to allow the cooling air to exit the plenum and access the components to be cooled. While such cooling air configurations were satisfactory to a certain degree, there remained room for improvement.

SUMMARY

In one aspect, there is provided a gas turbine engine comprising a gas path extending in serial flow communication across a compressor, a combustion chamber, and a turbine, the turbine having at least one multistage turbine section having a front toward the combustion chamber and a rear opposite the front, a plenum radially outward of the gas path, and a plurality of aperture sets interspaced from one another between the front and the rear, and the aperture sets providing fluid flow communication from the plenum to the gas path, and a cooling air path having an outlet fluidly connected to the plenum at the rear of the plenum.

In another aspect, there is provided a method of cooling a turbine section of a gas turbine engine, the method comprising: conveying cooling air in a plenum surrounding a main gas path in the turbine section, from a rear of the turbine section towards a front of the turbine section, in a direction contrary to the direction of the main gas path, and leaking a plurality of cooling flows from the plenum to the main gas path, at a plurality of axially interspaced positions.

DESCRIPTION OF THE DRAWINGS

Reference is now made to the accompanying figures in which:

FIG. 2 is a schematic cross-sectional view of a multistage turbine section of a gas turbine engine.

DETAILED DESCRIPTION

Figure 1:
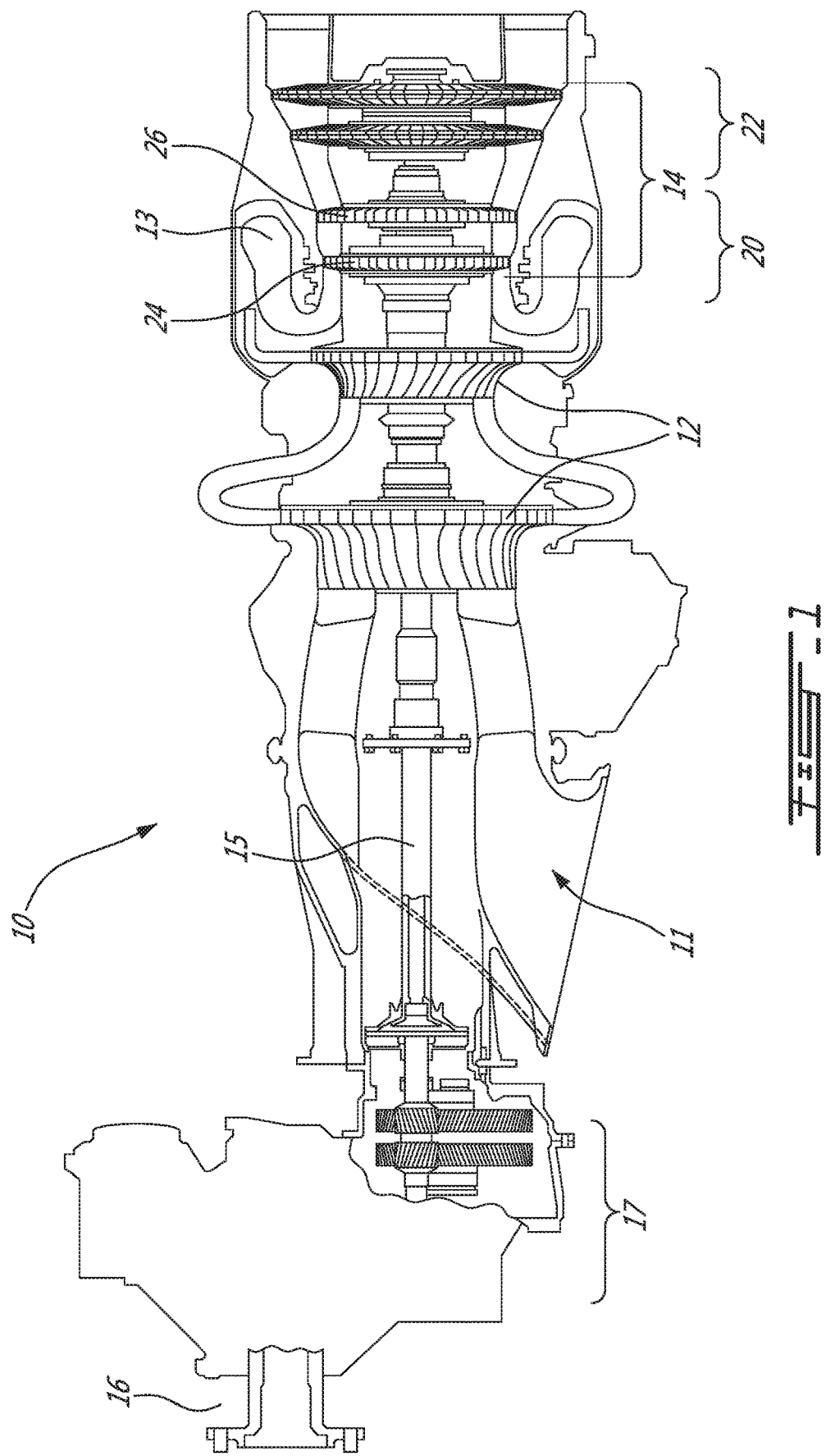
FIG. 1 is a schematic cross-sectional view of a gas turbine engine.

FIG. 1 illustrates an example of a gas turbine engine. In this example, the gas turbine engine is a gas turboprop engine 10 of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbine 14. In the specific case of a turboprop engine, a power shaft 15 connected to one of the turbine 14 projects forwardly to transmit a driving force to a propeller shaft 16 via a reduction gearbox generally shown at 17. Other types of gas turbine engines can have corresponding arrangements.

The gas path across the compressor 12, combustion chamber 13, and the turbine 14 can be referred to as the main gas path, and is typically annular in configuration, the gas turbine engine 10 having a generally cylindrical geometry centered around an axis of the power shaft 15.

The turbine 14 can include one or more turbine sections, and indeed, it is common for gas turbine engines to include in sequence both a high pressure (HP) turbine section 22 and a low pressure (LP) turbine section 20 housed in distinct casings. Typically, both the low pressure turbine section 20 and the high pressure turbine section 22 are "multistage" turbine sections in the sense that, as shown in the example provided in FIG. 2, each one has more than one set 24, 26, 28 of rotating blades and one or more sets 30, 32 of non-rotating vanes axially interspersing the sets of rotating blades 24, 26, 28. Each set of blades 24, 26, 28 includes a plurality of circumferentially interspaced blades and each set of vanes 30, 32 includes a plurality of circumferentially interspaced vanes.

The end of the turbine sections 20, 22 which receives the hot gas from the combustor and therefore serves as the inlet for the main gas path will be referred to herein as the front 34, or the front end, whereas the end of the turbine sections 20, 22 which communicates with the exhaust section and therefore serves as the outlet of the main gas path will be referred to as the rear 36, or rear end. It will be understood that the words front and rear are used herein for the sake of simplicity and ease of reference, to facilitate the distinction of one end from the other, and are not intended to refer to an orientation of the engine or of its axis relative to the position of the earth. Accordingly, in the context of this specification, a turbine section of a gas turbine engine having a vertically oriented axis would be referred to as having a front end and a rear end even though the expressions upper end and lower end may be better adapted to that specific scenario.

An example of a multi-stage turbine section 22 is presented in FIG. 2. In this specific example, the multi stage turbine section 22 includes three blade sets 24, 26, 28 axially interspersed by two vane sets 30, 32. The multi stage turbine section 22 has a front 34 which is fluidly connected to receive hot gasses directly or indirectly from the combustor 13, and a rear 36 which conveys the hot gasses directly or indirectly to an exhaust section. A plenum 38 is provided radially externally to the blade sets 24, 26, 28 and vane sets 30, 32. The plenum 38 is contained by a radially inner wall 42, a radially outer wall 40, a front wall 44, and a rear wall 46. In this embodiment, the radially inner wall 42 is a power turbine housing, and the radially outer wall 40 is a turbine support case. In this specific example, the multi-stage turbine section is a low pressure turbine section 22, although it will be understood that in another embodiment, the multi-stage turbine section can be a high pressure turbine section 20, for instance. Accordingly, in this case, the front wall 44 of the plenum 38 can connect an inter-turbine vane area 48 and the rear wall 46 of the plenum 38 can connect the turbine exhaust casing (not shown), for instance. These latter features, and the amount of vanes sets and blade sets, can vary in alternate embodiments.

A plurality of aperture sets 50, 52, 54, 56 are provided across the radially inner wall 42, the aperture sets 50, 52, 54, 56 being axially interspaced from one another along the plenum 38. The aperture sets 50, 52, 54, 56 lead radially internally to provide a path for the cooling air in the plenum 38 to cool corresponding hot turbine components. The expression "set" is used to refer to the fact that there can be a collection of occurrences circumferentially interspaced in disposition. For instance, a blade set has a plurality of circumferentially interspaced blades, and an aperture set can have a plurality of circumferentially interspaced apertures. This relates to the annular configuration of the gas path and the generally cylindrical geometry of the gas turbine engine. Alternately, an aperture set can include a radially and circumferentially interspaced gap, whether that gap is circumferentially continuous our discontinuous. The amount of aperture sets can vary in alternate embodiments.

In this specific embodiment, the cooling air configuration is provided with four aperture sets 50, 52, 54, 56, each schematized with corresponding arrows leading radially internally across the power turbine housing. In this embodiment, the aperture sets 50, 52 near the front, where the gas has the most energy, are designed to allow a greater flow rate of cooling air than the ones closer to the rear 54, 56, and this is especially true for the second aperture set 52 which leads to the blade shroud 60 and which has the greatest flow rate of the four sets. In alternate embodiments, the number of aperture sets can vary and the set which provides the greatest flow rate can be another one of the sets. The cooling air circulated in the plenum 38 can be compressed air obtained from the compressor 12, for instance, as it will be understood that there must be a pressure differential, and a sufficiently high pressure of air in the plenum 38, for the cooling air to flow from the plenum 38 to the turbine components and into the main gas path.

In a first scenario the cooling air can be introduced into the plenum 38 across the front wall 44. In this scenario, the air will circulate first across the first and second aperture sets 50, 52, and continue on to reach the third 54 and eventually the fourth 56 aperture set. In this sequence, the cooling air will tend to be strongly swallowed by the first and second aperture sets 50, 52, especially given the fact that the second aperture set 52 allows the greatest flow rate (combination of fluid circulation cross-section, pressure differential, and any other relevant aerodynamic consideration) of all aperture sets in this embodiment. The flow rate continuing inside the plenum 38 after the second aperture set 52 will equal the sum of the flow rates across the third and fourth aperture sets 54, 56 in this embodiment, and will correspond to less than half of the flow rate across the front wall 44. The velocity of the cooling air will depend on the flow rate and the fluid circulation cross section (in addition to other aerodynamic considerations), and if the fluid circulation cross section downstream of the second aperture set 52 is comparable to the fluid circulation cross section upstream of the second aperture set 52, the velocity of the cooling air will be lower downstream of the second aperture set 52. The expression fluid circulation cross-section refers to a cross-sectional area generally perpendicular to the direction of fluid flow.

The flow rate through aperture sets 50, 52, 54, 56 depends on the pressure differential, and the absolute pressure in the plenum 38 can decrease downstream of the second aperture set 52 due to evacuation of fluid across the second aperture set 52. The circulating cooling air flow will pick up heat from the power turbine housing, and when it ultimately reaches the fourth aperture set 56, leading to the third power turbine vane set 28, the cooling efficiency will be limited by the flow rate (affected by amount of remaining cooling air and by pressure in plenum 38, and any other relevant aerodynamic consideration) and the temperature of the cooling air across the fourth aperture set 56, which will be higher than the temperature of the cooling air across the first aperture set 50. The air being strongly swallowed by the first set 50 or sets 50, 52 of apertures, in the front portion of the plenum 38, the pressure and flow rate available for the last set or sets of apertures 54, 56 is reduced in the rear portion of the plenum, and this reduced amount of remaining air has received heat from the power turbine housing as it circulates from front 34 to rear 36, and can be less effective in performing its cooling function when it reaches the last set or sets 54, 56 of apertures at the rear 36.

In a second scenario, rather than feeding the cooling air at the front 34 of the plenum 38, the cooling air is conveyed and fed into the plenum 38 at the rear 36 of the turbine section 22, and is then circulated from the rear 36 to the front 34, in a direction opposite to the direction of the gas in the main gas path. It was found that in some embodiments, this second scenario can lead to better air usage. Indeed, in the illustrated embodiment, for instance, the full pressure is available at the fourth aperture set 56, and the flow rate across the fourth aperture set 56 being limited, a relatively high flow rate still circulates between the fourth 56 and third 54 aperture sets. The fourth and third aperture sets 56, 54 being directed respectively to the third turbine stage 32, 28 and the second turbine stage 30, 26, tip clearance of the blades 26, 28 of these stages may be better controlled than in the first scenario. Indeed, it will be understood that in this scenario, for a given embodiment, the velocity of the air circulating between the fourth and third aperture sets 56, 54 will be greater than the velocity of the air circulating in the first scenario presented above. The amount of heat per amount of gas received from the power turbine housing will be lower in the second scenario than in the first scenario because the heat will be distributed to more gas (given volume of gas at higher pressure), and the time of exposure of the gas to the heat of the power turbine housing will be reduced given the higher velocity. The gain in efficiency can be achieved by positioning the inlet 62 of the plenum 38 (or otherwise said the outlet 62 of the cooling air path 64) in a manner for the cooling air path to reach aperture sets having smaller fluid flow cross-sectional areas (aperture sets 54 and 56 in this case) before reaching the aperture set having the greatest fluid flow cross-sectional area (aperture set 52 in this case), for instance. Using specifically sized apertures for the aperture sets associated to the different turbine stages, one can control how much air is fed from the plenum 38 to satisfy the air requirement for each stage.

In the embodiment illustrated, a cooling air path 64 is provided radially externally to the plenum 38, to allow the cooling air to reach the inlet of the plenum 38, at the rear 36 of the turbine section 22. More specifically, the cooling air path is provided by an additional casing 66 provided externally to the turbine support case. In an alternate embodiment, the cooling air path 64 can be embodied in a different manner. For instance, the cooling air path 64 can be provided in the form of an external tube.

The above description is meant to be exemplary only, and one skilled in the art will recognize that changes may be made to the embodiments described without departing from the scope of the invention disclosed. For example, while the example presented above and illustrated presents the cooling air configuration and the associated turbine section in the context of a turboprop engine, other embodiments can be adapted to the turbine sections of other gas turbine engines, such as turbofan or turboshaft engines, for instance. While the example presented above and illustrated was presented in the context of a low pressure turbine section, it will be understood that other embodiments can be adapted to the context of higher pressure turbine sections. Still other modifications which fall within the scope of the present invention will be apparent to those skilled in the art, in light of a review of this disclosure, and such modifications are intended to fall within the appended claims.

The invention claimed is:

1. A gas turbine engine comprising a gas path annularly extending around a central axis and extending in serial flow communication across a compressor, a combustion chamber, and a turbine, the turbine having a support case, a housing secured to the support case and located radially inwardly of the support case, at least one multistage turbine section having a front toward the combustion chamber and a rear opposite the front, a plenum radially outward of the gas path and between the housing and the support case, the plenum axially extending from a first location upstream of both of at least one stage of the at least one multistage turbine section to another location downstream of the at least one stage relative to a flow direction in the gas path, the at least one stage including a set of vanes and a set of blades, and a plurality of aperture sets axially interspaced from one another relative to the central axis between the front and the rear and extending through the housing, the aperture sets providing fluid flow communication from the plenum to the gas path, and a cooling air path having an outlet fluidly connected to the plenum at the rear of the plenum.

2. The gas turbine engine of claim 1 wherein each one of the aperture sets includes a plurality of circumferentially interspaced apertures.

3. The gas turbine engine of claim 1 wherein the aperture sets include at least a first aperture set, and a second aperture set, and a third aperture set at corresponding axial positions from the front to the rear, the first aperture set having a cross-sectional flow area greater than a cross-sectional flow area of either one of the second aperture set or the third aperture set.

4. The gas turbine engine of claim 3 wherein one of said aperture sets provides fluid flow communication from the plenum to the gas path via a shroud of a pressure turbine blade stage.

5. The gas turbine engine of claim 4 wherein the pressure turbine blade stage is a first stage of the multistage turbine section, further comprising a pressure turbine vane stage adjacent the first stage, towards the rear, and a second pressure turbine blade stage adjacent the pressure turbine vane stage, towards the rear, the second aperture set providing fluid flow communication to the gas path via a shroud of the pressure turbine vane stage.

6. The gas turbine engine of claim 3 wherein the third aperture set provides fluid flow communication from the plenum to the gas path immediately upstream of a rearmost pressure turbine blade stage of the multistage turbine section.

7. The gas turbine engine of claim 3 wherein the aperture sets further include at least a fourth aperture set, the fourth aperture set being located axially between the first aperture set and the front of the multistage turbine section.

8. The gas turbine engine of claim 3 wherein the first aperture set is located closer to the front than to the rear of the multistage turbine section.

9. The gas turbine engine of claim 1 wherein the plenum has a radially inner wall and a radially outer wall, further comprising a cooling air path wall radially outwardly of the radially outer wall of the plenum, the cooling air path extending between the cooling air path wall and the radially outer wall of the plenum.

10. The gas turbine engine of claim 1 wherein the cooling air path is provided in the form of a tube extending radially outwardly of the plenum.

11. The gas turbine engine of claim 1 wherein the cooling air path has an inlet connected to collect compressed air from the compressor.

12. The gas turbine engine of claim 1 wherein the multistage turbine section is a low pressure turbine section, the turbine further having a high pressure turbine section fluidly connected between the low pressure turbine section and the combustion chamber.

13. The gas turbine engine of claim 12 wherein the plenum extends axially between an inter turbine vane area at front and turbine exhaust case at rear.

14. A method of cooling a turbine section of a gas turbine engine, the method comprising: conveying cooling air in a plenum surrounding a main gas path in the turbine section, from a rear of the turbine section towards a front of the turbine section, in a direction contrary to the direction of the main gas path, the plenum axially extending from a first location upstream of both of at least one stage of the turbine section to another location downstream of the at least one stage relative to a flow direction in the main gas path, the at least one stage including a set of vanes and a set of blades, and leaking a plurality of cooling flows from the plenum to the main gas path, via a plurality of axially interspaced apertures defined through a housing located radially outwardly of the main gas path.

15. The method of claim 14 further comprising conveying cooling air from a compressor of the gas turbine engine to the plenum.

16. The method of claim 14 wherein the axially interspaced cooling flows have different flow rates, one of said cooling flows having a greater flow rate than the flow rates of the other cooling flows, said cooling flow having the greater flow rate being located closer to he front of the turbine section than to the rear of the turbine section.

17. The method of claim 16 wherein the cooling flow having the greater flow rate is conveyed across a shroud of a first pressure turbine blade stage of a multiple stage turbine section, relative the fluid flow direction, and other ones of the cooling flows are directed to other ones of the stages.

18. The method of claim 14 further comprising receiving hot gasses produced by the combustor from the front of the turbine section, extracting energy from the hot gasses via a plurality of blade stages of the turbine section, and exhausting the hot gasses towards the rear.

* * * * *